(12) United States Patent
Burnett et al.

(10) Patent No.: US 9,560,873 B2
(45) Date of Patent: Feb. 7, 2017

(54) ANTIMICROBIAL COMPOSITIONS AND METHODS FOR TREATING PACKAGED FOOD PRODUCTS

(75) Inventors: Scott L. Burnett, St. Paul, MN (US); Jocelyn H. Chopskie, Eagan, MN (US); Joy G. Herdt, Hastings, MN (US); Teresa C. Podtburg, Waconia, MN (US); Timothy A. Gutzmann, Eagan, MN (US); Daniel G. Brown, Austin, MN (US); Richard J. Christianson, Austin, MN (US); Harriet L. E. Ulland, Austin, MN (US)

(73) Assignee: Ecolab USA Inc., St. Paul, MN (US)

(*) Notice: Subject to any disclaimer, the term of this patent is extended or adjusted under 35 U.S.C. 154(b) by 1613 days.

(21) Appl. No.: 11/459,067

(22) Filed: Jul. 21, 2006

(65) Prior Publication Data

US 2007/0020364 A1 Jan. 25, 2007

Related U.S. Application Data

(60) Provisional application No. 60/702,242, filed on Jul. 25, 2005.

(51) Int. Cl.

| | |
|---|---|
| *B65B 55/00* | (2006.01) |
| *A23B 4/20* | (2006.01) |
| *A21D 4/00* | (2006.01) |
| *A23C 3/00* | (2006.01) |
| *A23L 3/34* | (2006.01) |
| *A23B 7/154* | (2006.01) |
| *A23K 3/00* | (2006.01) |
| *A23L 1/16* | (2006.01) |

(Continued)

(52) U.S. Cl.
CPC .............. *A23L 3/02* (2013.01); *A23B 4/0056* (2013.01); *A23B 4/012* (2013.01); *A23B 4/20* (2013.01); *A23B 4/24* (2013.01); *A23L 3/3463* (2013.01); *A23L 3/358* (2013.01)

(58) Field of Classification Search
CPC .......... A23L 3/02; A23L 3/358; A23L 3/3463; A23B 4/0056; A23B 4/012; A23B 4/20; A23B 4/24
USPC ................ 426/321, 323–326, 331–332, 335, 392,426/401, 407–408, 520–521
See application file for complete search history.

(56) References Cited

U.S. PATENT DOCUMENTS

| | | | |
|---|---|---|---|
| 2,858,225 | A | 10/1958 | Gooding et al. |
| 3,057,735 | A | 10/1962 | Crittenden Ottke et al. |

(Continued)

FOREIGN PATENT DOCUMENTS

| | | |
|---|---|---|
| EP | 0128610 | 12/1984 |
| EP | 0750853 | 1/1997 |

(Continued)

OTHER PUBLICATIONS

Cadwallader, "Wood Smoke," 2007 (no month), Blackwell Publishing, pp. 201-205.*

(Continued)

*Primary Examiner* — Lien T Tran
*Assistant Examiner* — Tynesha McClain-Coleman
(74) *Attorney, Agent, or Firm* — Merchant & Gould P.C.

(57) ABSTRACT

The present invention relates to a method of using an antimicrobial composition on a food product where the antimicrobial composition is applied to a food product, the food product is packaged and sealed, and then activation energy is applied to the sealed food product.

12 Claims, 2 Drawing Sheets

(51) Int. Cl.

| | | |
|---|---|---|
| A23L 3/36 | (2006.01) | |
| A23B 7/005 | (2006.01) | |
| A23L 3/02 | (2006.01) | |
| A23B 4/005 | (2006.01) | |
| A23B 4/01 | (2006.01) | |
| A23B 4/24 | (2006.01) | |
| A23L 3/3463 | (2006.01) | |
| A23L 3/358 | (2006.01) | |

(56) References Cited

U.S. PATENT DOCUMENTS

| | | | |
|---|---|---|---|
| 3,443,972 A | | 5/1969 | DiMarco et al. |
| 3,653,927 A | * | 4/1972 | Howell et al. ............... 426/412 |
| 3,867,300 A | | 2/1975 | Karabinos et al. |
| 4,002,775 A | | 1/1977 | Kabara |
| 4,067,997 A | | 1/1978 | Kabara |
| 4,404,040 A | | 9/1983 | Wang |
| 4,647,458 A | | 3/1987 | Ueno et al. |
| 4,776,974 A | | 10/1988 | Stanton et al. |
| 5,043,174 A | * | 8/1991 | Lindner ..................... 426/315 |
| 5,208,257 A | | 5/1993 | Kabara |
| 5,234,703 A | | 8/1993 | Guthery |
| 5,234,719 A | | 8/1993 | Richter et al. |
| 5,330,769 A | | 7/1994 | McKinzie et al. |
| 5,382,391 A | * | 1/1995 | Juhl et al. ..................... 264/470 |
| 5,391,379 A | | 2/1995 | McKinzie et al. |
| 5,536,008 A | | 7/1996 | Clapper, Jr. |
| 5,573,797 A | * | 11/1996 | Wilhoit ........................ 426/106 |
| 5,573,800 A | | 11/1996 | Wilhoit |
| 6,033,705 A | | 3/2000 | Isaacs |
| 6,063,425 A | | 5/2000 | Kross et al. |
| 6,113,963 A | | 9/2000 | Gutzmann et al. |
| 6,136,769 A | | 10/2000 | Asano et al. |
| 6,183,807 B1 | | 2/2001 | Gutzmann et al. |
| 6,187,348 B1 | | 2/2001 | Polster |
| 6,262,038 B1 | | 7/2001 | Pierce et al. |
| 6,472,358 B1 | | 10/2002 | Richter et al. |
| 6,500,861 B1 | | 12/2002 | Wider |
| 6,509,050 B1 | | 1/2003 | Henson et al. |
| 6,528,101 B1 | | 3/2003 | Polster |
| 6,559,189 B2 | | 5/2003 | Baker, Jr. et al. |
| 6,579,556 B2 | | 6/2003 | Kirby et al. |
| 6,586,026 B1 | | 7/2003 | Ramesh et al. |
| 6,613,364 B2 | | 9/2003 | Begg et al. |
| 6,620,446 B2 | | 9/2003 | King et al. |
| 6,638,978 B1 | | 10/2003 | Kabara |
| 6,767,569 B1 | | 7/2004 | Marsden et al. |
| 6,843,043 B2 | | 1/2005 | Hanson et al. |
| 6,976,347 B2 | | 12/2005 | Karman et al. |
| 7,090,882 B2 | | 8/2006 | Koefod et al. |
| 2002/0064585 A1 | | 5/2002 | Christianson et al. |
| 2002/0164405 A1 | | 11/2002 | Polster |
| 2002/0192340 A1 | * | 12/2002 | Swart et al. ................. 426/234 |
| 2002/0197366 A1 | | 12/2002 | King et al. |
| 2003/0039632 A1 | | 2/2003 | Stiles et al. |
| 2003/0047087 A1 | | 3/2003 | Phebus et al. |
| 2003/0099745 A1 | | 5/2003 | Grinstead et al. |
| 2003/0228401 A1 | | 12/2003 | Newman et al. |
| 2004/0013694 A1 | | 1/2004 | Newman et al. |
| 2004/0018283 A1 | | 1/2004 | Hirschey et al. |
| 2004/0018284 A1 | | 1/2004 | Kuethe et al. |
| 2004/0033296 A1 | | 2/2004 | Yuan et al. |
| 2004/0043922 A1 | | 3/2004 | Naidu |
| 2004/0050020 A1 | | 3/2004 | Hanson et al. |
| 2004/0058041 A1 | | 3/2004 | Greenwald |
| 2004/0105927 A1 | | 6/2004 | Karman et al. |
| 2004/0131709 A1 | | 7/2004 | Berdahl et al. |
| 2004/0146619 A1 | | 7/2004 | Maye |
| 2004/0166216 A1 | | 8/2004 | Marsden et al. |
| 2004/0175480 A1 | | 9/2004 | Seman et al. |
| 2005/0022468 A1 | | 2/2005 | Hanson et al. |
| 2005/0032668 A1 | | 2/2005 | Pedersen et al. |
| 2005/0152991 A1 | | 7/2005 | Man et al. |
| 2005/0159324 A1 | | 7/2005 | Man et al. |
| 2006/0024414 A1 | * | 2/2006 | Turek et al. ................. 426/335 |
| 2006/0286229 A1 | | 12/2006 | Koefod et al. |
| 2007/0020366 A1 | | 1/2007 | Luchansky et al. |

FOREIGN PATENT DOCUMENTS

| | | |
|---|---|---|
| EP | 0940090 | 9/1999 |
| EP | 1561801 | 8/2005 |
| EP | 1621085 | 2/2006 |
| JP | S59156274 | 9/1984 |
| JP | 06054672 | 3/1994 |
| JP | H07123958 | 5/1995 |
| JP | H11313651 | 11/1999 |
| JP | 2001299300 | 10/2001 |
| JP | 2004106941 | 4/2004 |
| JP | 2006042818 | 2/2006 |
| WO | WO 9805216 A1 * | 2/1998 |
| WO | WO01/05254 | 1/2001 |
| WO | WO01/49121 | 7/2001 |
| WO | WO02/054866 | 7/2002 |
| WO | WO02/060280 | 8/2002 |
| WO | WO03/073849 | 9/2003 |
| WO | WO2004/057984 | 7/2004 |

OTHER PUBLICATIONS

Poysky et al., Inactivation of Listeria monocytogenes on Hot-smoked Salmon by the Interaction of Heat and Smoke or Liquid Smoke, Jun. 1997, vol. 60, No. 6, Abstract.*

Pearson et al., Listeria monocytogenes—Threat to a Safe Food Supply: A Review, 1990 (no month), Journal of Dairy Science, vol. 73, No. 4, p. 923.*

Doyle, Literature Survey of the Various Techniques Used in Listeria Intervention, Nov. 1999, Food Research Institute, p. 5.*

Chen, Sebranek, Dickson & Mendonca, "*Combining Pediocin (Alta 2341) with Postpackaging Thermal Pasteurization for Control of Listeria monocytogenes on Frankfurters*", Journal of Food Protection, vol. 67, No. 9, 2004, pp. 1855-1865, 11 pgs., Sep. 1, 2004.

Gombas, D, Chen, Y., Clavero, R., and Scott, V., "*Survey of Listeria monocytogenes in Ready-to-Eat Foods*", National Food Journal of Food Protection, vol. 66, No. 4, 2003, pp. 559-569, 11 pgs., Apr. 1, 2003.

Ababouch, L., Chaibi, A., Busta, F.F., Inhibition of Bacterial Spore Growth by Fatty Acids and Their Sodium Salts, Journal of Food Protection, vol. 55, No. 12, Dec. 1992, pp. 980-984, International Association for Food Protection.

Ariyapitipun, Tipayanate; Mustapha, Azlin; Clarke, Andrew D., "Survival of Listeria monocytogenes Scott A on Vacuum-Packaged Raw Beef Treated with Polylactic Acid, Lactic Acid, and Nisin", Journal of Food Protection, vol. 63, No. 1, Jan. 2000, pp. 131-136(6), International Association for Food Protection.

Bedie G.K.; Samelis J.; Sofos J.N.; Belk K.E.; Scanga J.A.; Smith G.C., "Antimicrobials in the Formulation to Control Listeria monocytogenes Postprocessing Contamination on Frankfurters Stored at 4° C. in Vacuum Packages", Journal of Food Protection, vol. 64, No. 12, Dec. 1, 2001, pp. 1949-1955(7), International Association for Food Protection.

Bedie G.K.; Kain, M.L. Samelis, J., Sofos, J.N. Belk K.E.; Scanga J.A.; Smith G.C., "Evaluation of Antimicrobial Incorporated into the Formulation Against Post-Processing Contamination of Listeria monocytogenes on Frankfurters Stored at 4° C. in Vacuum Packages", 2001 Animal Sciences Research Report, the Department of Animal Sciences, Colorado State University, pp. 1-5.

Blaszyk, M., Holley, R.A., "Interaction of monolaurin, eugenol and sodium citrate on growth of common meat spoilage and pathogenic organisms", International Journal of Food Microbiology 39 (1998) pp. 175-183, Feb. 17, 1998.

C.-M. Chen; J.G. Sebranek; J.S. Dickson; A.F. Mendonca, "Combining Pediocin with Postpackaging Irradiation for Control of Listeria monocytogenes on Frankfurters", Journal of Food Protection, vol. 67, No. 9, Sep. 1, 2004, pp. 1866-1875(10), International Association for Food Protection.

Calicioglu M.; Kaspar C.W.; Buege D.R.; Luchansky J.B., "Effectiveness of Spraying with Tween 20 and Lactic Acid in Decontami-

(56) References Cited

OTHER PUBLICATIONS nating Inoculated *Escherichia coli* O157:H7 and Indigenous *Escherichia coli* Biotype I on Beef", Journal of Food Protection, vol. 65, No. 1, Jan. 1, 2002, pp. 26-32(7), International Association for Food Protection.

Chen, C., Sebranek, JG., Dickson, J.S., Mendonca, A.F., "Use of Pediocin (Alta™ 2341) for Control of Listeria monocytogenes on Frankfurters", Journal of Muscle Foods, vol. 15, pp. 35-56, Apr. 2004.

Davies, E. Alison; Milne, Catherine F.; Bevis, Helen E.; Potter, Richard W.; Harris, Jo M.; Williams, Graham C.; Thomas, Linda V.; Delves-Broughton, Joss, "Effective Use of Nisin to Control Lactic Acid Bacterial Spoilage in Vacuum-Packed Bologna-type Sausage", Journal of Food Protection, vol. 62, No. 9, Sep. 1999, pp. 1004-1010(7), International Association for Food Protection.

Farid, M., Bal'A, A., Marshall, D.L., "Organic Acid Dipping of Catfish Fillets: Effect on Color, Microbial Load, and Listeria monocytogenes", Journal of Food Protection, vol. 61, No. 11, 1998, pp. 1470-1474, International Association for Food Protection, Nov. 1998.

Friedman M.; Henika P.R.; Mandrell R.E., "Antibacterial Activities of Phenolic Benzaldehydes and Benzoic Acids against Campylobacter jejuni, *Escherichia coli*, Listeria monocytogenes, and *Salmonella enterica*", Journal of Food Protection, vol. 66, No. 10, Oct. 1, 2003, pp. 1811-1821(11), International Association for Food Protection.

Friedman M.; Henika P.R.; Mandrell R.E., "Bactericidal Activities of Plant Essential Oils and Some of Their Isolated Constituents against Campylobacter jejuni, *Escherichia coli*, Listeria monocytogenes, and *Salmonella enterica*", Journal of Food Protection, vol. 65, No. 10, Oct. 1, 2002, pp. 1545-1560(16), International Association for Food Protection.

Gande N.; Muriana P., "Prepackage Surface Pasteurization of Ready-to-Eat Meats with a Radiant Heat Oven for Reduction of Listeria monocytogenes", Journal of Food Protection, vol. 66, No. 9, Sep. 1, 2003, pp. 1623-1630(8), International Association for Food Protection.

Glass K.A.; Granberg D.A.; Smith A.L.; McNamara A.M.; Hardin M.; Mattias J.; Ladwig K.; Johnson E.A., "Inhibition of Listeria monocytogenes by Sodium Diacetate and Sodium Lactate on Wieners and Cooked Bratwurst", Journal of Food Protection, vol. 65, No. 1, Jan. 1, 2002, pp. 116-123(8), International Association for Food Protection.

Islam M.; Chen J.; Doyle M.P.; Chinnan M., "Control of Listeria monocytogenes on Turkey Frankfurters by Generally-Recognized-as-Safe Preservatives", Journal of Food Protection, vol. 65, No. 9, Sep. 1, 2002, pp. 1411-1416(6), International Association for Food Protection.

Islam M.; Chen J.; Doyle M.P.; Chinnan M., "Effect of Selected Generally Recognized as Safe Preservative Sprays on Growth of Listeria monocytogenes on Chicken Luncheon Meat", Journal of Food Protection, vol. 65, No. 5, May 1, 2002, pp. 794-798(5), International Association for Food Protection.

J.B. Luchansky, J.E. Call, B. Hristova, L. Rumery, L. Yoder and A. Oser, "Viability of Listeria monocytogenes on commercially-prepared hams surface treated with acidic calcium sulfate and lauric arginate and stored at 4° C.", Meat Science, vol. 71, Issue 1, Sep. 2005, pp. 92-99.

McEntire J.C.; Montville T.J.; Chikindas M.L., "Synergy between Nisin and Select Lactates against Listeria monocytogenes Is Due to the Metal Cations", Journal of Food Protection, vol. 66, No. 9, Sep. 1, 2003, pp. 1631-1636(6), International Association for Food Protection.

Muriana P.M.; Quimby W.; Davidson C.A.; Grooms J., "Postpackage Pasteurization of Ready-to-Eat Deli Meats by Submersion Heating for Reduction of Listeria monocytogenes", Journal of Food Protection, vol. 65, No. 6, Jun. 1, 2002, pp. 963-969(7), International Association for Food Protection.

Muriana, P, Escoubas, J. R., "Pre- and Post-package Pasteurization of RTE Meats for Reduction of Listeria monocytogenes", Oklahoma State University, AMI Foundation, Feb. 2004, 4 pages.

Murphy R.Y.; Berrang M.E., "Thermal Lethality of *Salmonella senftenberg* and Listeria innocua on Fully Cooked and Vacuum Packaged Chicken Breast Strips during Hot Water Pasteurization", Journal of Food Protection, vol. 65, No. 10, Oct. 1, 2002, pp. 1561-1564(4), International Association for Food Protection.

Murphy R.Y.; Duncan L.K.; Driscoll K.H.; Beard B.L.; Berrang M.B.; Marcy J.A. "Determination of Thermal Lethality of Listeria monocytogenes in Fully Cooked Chicken Breast Fillets and Strips during Postcook In-Package Pasteurization", Journal of Food Protection, vol. 66, No. 4, Apr. 1, 2003, pp. 578-583(6), International Association for Food Protection.

Murphy R.Y.; Duncan L.K.; Driscoll K.H.; Marcy J.A.; Beard B.L., "Thermal Inactivation of Listeria monocytogenes on Ready-to-Eat Turkey Breast Meat Products during Postcook In-Package Pasteurization with Hot Water", Source: Journal of Food Protection, vol. 66, No. 9, Sep. 1, 2003, pp. 1618-1622(5), International Association for Food Protection.

Nykanen, A., Weckman, K., Lapvetelainen, A., "Synergistic inhibition of Listeria monocytogenes on cold-smoked rainbow trout by nisin and sodium lactate", International Journal of Food Microbiology, vol. 61 (2000), pp. 63-72, Oct. 2000.

Porto A.C.S.; Call J.E.; Luchansky J.B., "Effect of Reheating on Viability of a Five-Strain Mixture of Listeria monocytogenes in Vacuum-Sealed Packages of Frankfurters following Refrigerated or Frozen Storage", Journal of Food Protection, vol. 67, No. 1, Jan. 1, 2004, pp. 71-76(6), International Association for Food Protection.

Samelis J.; Bedie G.K.; Sofos J.N.; Belk K.E.; Scanga J.A.; Smith G.C., "Control of Listeria monocytogenes with Combined Antimicrobials after Postprocess Contamination and Extended Storage of Frankfurters at 4°0 C. in Vacuum Packages", Journal of Food Protection, vol. 65, No. 2, Feb. 1, 2002, pp. 299-307(9), International Association for Food Protection.

Samelis J.; Sofos J.N.; Kain M.L.; Scanga J.A.; Belk K.E.; Smith G.C., "Organic Acids and Their Salts as Dipping Solutions to Control Listeria monocytogenes Inoculated following Processing of Sliced Pork Bologna Stored at 4° C. in Vacuum Packages", Journal of Food Protection, vol. 64, No. 11, Nov. 1, 2001, pp. 1722-1729(8), International Association for Food Protection.

Vermeiren, L., Devlieghere, F., Debevere, J., "Effectiveness of some recent antimicrobial packaging concepts", Food Additives and Contaminants, 2002, vol. 19, Supplement, 163-171, Apr. 1, 2002.

Yen, L.C., Sofos, J.N., Schmidt, G.R., "Effect of Meat Curing Ingredients on Thermal Destruction of Listeria monocytogenes in Ground Pork", Journal of Food Protection. vol. 54, pp. 408-412, International Association for Food Protection, Jun. 1991.

Zeitoun, A.A.M., Debevere, J.M., "Inhibition, survival and growth of Listeria monocytogenes on poultry as influenced by buffered lactic acid treatment and modified atmosphere packaging", International Journal of Food Microbiology, vol. 14 (1991), pp. 161-170, Nov. 1991.

Juneja V.K. et al., "Control of clostridium perfringens in a model roast beef by salts of organic acids during chilling", Journal of Food Safety, vol. 24, No. 2, 2004, pp. 95-108, XP008071343, ISSN: 0149-6085, Jul. 2004.

McCormick K.E. et al., "In-package pasteurization combined with biocide-impregnated films to Listeria Monocytogenes and *Salmonella typhimurium* in turkey bologna." Journal of Food Science, vol. 70, No. 1, Jan. 2005, pp. M52-M57, XP008071365.

* cited by examiner

FIG. 1
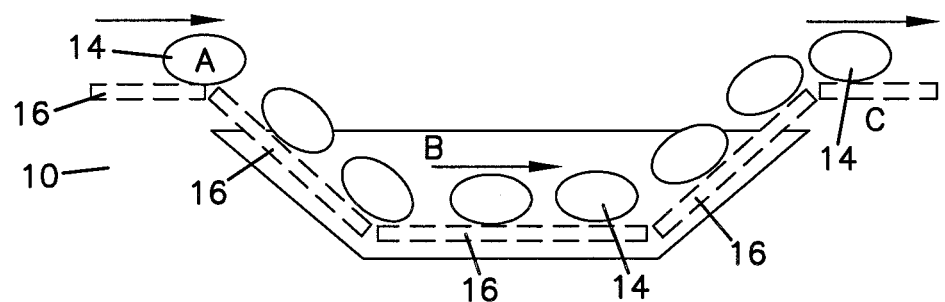
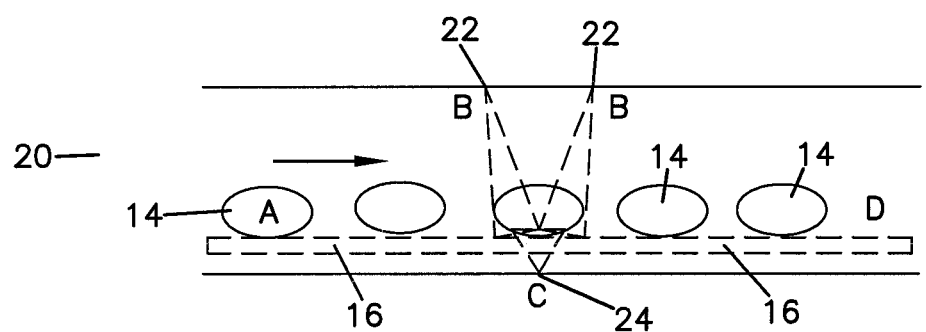
FIG. 2

ANTIMICROBIAL COMPOSITIONS AND METHODS FOR TREATING PACKAGED FOOD PRODUCTS

CROSS REFERENCE TO RELATED APPLICATIONS

This application claims priority under 35 U.S.C. §119(e) to U.S. Provisional Application entitled "ANTIMICROBIAL COMPOSITIONS AND METHODS FOR TREATING PACKAGED FOOD PRODUCTS", Ser. No. 60/702,242, filed on Jul. 25, 2005, which is incorporated herein by reference in its entirety. This application is related to subject matter disclosed in U.S. patent application for "ANTIMICROBIAL COMPOSITIONS FOR USE ON FOOD PRODUCTS", U.S. patent application Ser. No. 11/459,069, filed concurrently herewith, the subject matter of which is incorporated in this application by reference.

FIELD OF THE INVENTION

The present invention relates to a method of using an antimicrobial composition on a packaged food product where the antimicrobial composition is applied to a food product or within the final food product package, the food product is packaged and sealed, and then activation energy is applied to the sealed product to activate the antimicrobial composition.

BACKGROUND

During the processing, preparation and packaging of food products, the food product may encounter microorganisms which may make the food unsuitable for consumption. The microorganisms may come from the food itself, the food contact surfaces, and/or the surrounding environment. The microorganisms can range from pathogenic microorganisms (e.g., *Listeria monocytogenes*, enterohemorrhagic *Escherichia coli, Salmonella* and the like) to spoilage organisms that can affect the taste, color, and/or smell of the final food product (e.g., *Pseudomonas, Acinetobacter, Moraxella, Alcaligenes, Flavobacterium, Erwinia*, and the like). Microorganisms can affect a wide variety of food products including meat, poultry, fish and shellfish, cheese, fruits and vegetables, and pre-prepared foods. At certain levels, the presence of microorganisms on a food product may cause everything from a consumer's perception of a lower quality product, to regulatory investigations and sanctions, to foodbourne illness and death.

Food processors use a variety of methods during processing to control and/or reduce the presence of microorganisms on food products. These methods include everything from cleaning and sanitizing the food processing plant environment, applying or incorporating antimicrobials to or in the food product, irradiating the food product, applying heat, and others. Applying or incorporating an antimicrobial composition to or in the food product is a preferred way of controlling microorganisms. However, it is difficult to formulate a composition that is effective at reducing microorganisms using ingredients that are acceptable for direct food contact according to government regulations. Further, it is difficult to formulate a composition that can be applied directly to a food product without adversely affecting the color, taste, or smell of the food product. Finally, once a food product has been treated with an antimicrobial composition or process to control the presence of microorganisms on the food product, the opportunity exists for the food product to become re-contaminated during further processing.

Food safety agencies have issued guidelines for processing food that may have exposure to surfaces contaminated with microorganisms including *Listeria monocytogenes, Salmonella*, and *E. coli* O157-H7. See e.g., Food Safety Inspection Service (FSIS) final rule for the control of *Listeria monocytogenes* in ready-to-eat (RTE) meat and poultry products, 9 CFR 430.

The FSIS guidelines on *Listeria* provide three alternatives for controlling the presence of *Listeria* on a RTE product. Under Alternative 1, an establishment applies a post-lethality treatment to the RTE product and an antimicrobial agent or process to control or suppress the growth of *L. monocytogenes* during the shelf life of the RTE product. Under Alternative 2, an establishment applies either a post-lethality treatment or an antimicrobial agent or process to suppress the growth of *L. monocytogenes*. Under Alternative 3, an establishment does not apply any post-lethality treatment or antimicrobial agent or process. Instead, it relies on its sanitation program to prevent the presence of *L. monocytogenes*. RTE products produced under Alternative 2 have greater control over potential *Listeria* contamination than RTE products produced under Alternative 3. Similarly, RTE products produced under Alternative 1 have greater control over *Listeria* contamination than those produced under Alternative 2. Besides providing better microbial control for RTE products, facilities operating under Alternative 1 are subject to less agency intervention (e.g., inspections, recordkeeping, etc.) than an Alternative 2 or Alternative 3 facility.

*Salmonella* is known to be prevalent on raw poultry, beef, and pork. Further, *Salmonella* has a high incidence of causing foodbourne illness, and sometimes severe foodbourne illness. Establishments must employ processes validated to achieve specific levels of reduction of *Salmonella* organisms throughout their finished RTE meat and poultry product (6.5 $\log_{10}$ throughout finished meat products and 7 $\log_{10}$ throughout finished poultry products).

*E. coli* O157:H7 has been linked to foodbourne illness outbreaks. The FSIS has additional lethality performance standards for all fermented RTE products that include any amount of beef, except thermally-processed, commercially sterile products. Establishments must employ processes validated to achieve a 5.0 $\log_{10}$ reduction of *E. coli* O157:H7 throughout fermented products containing beef.

It is against this background that the present invention has been made.

SUMMARY

Surprisingly, it has been discovered that microorganisms on food products can be further controlled by applying an antimicrobial composition to the food product or within the final food product package, packaging the food product, sealing the packaging and, once the food product is sealed, applying activation energy to the sealed food product to further activate the antimicrobial composition inside the packaging. This method has several advantages. For example, the initial application of the antimicrobial composition reduces the number of microorganisms on the surface of the food product on contact. Further, by allowing the antimicrobial composition to remain on the food product when the food product is packaged and sealed and treated with an activation energy, the antimicrobial composition can reduce the number of microorganisms on the food product between the initial application and packaging if the food product becomes re-contaminated. The result is better control of pathogenic and/or spoilage microorganisms in the final food product and enhanced consumer satisfaction.

These and other embodiments will be apparent to those of skill in the art and others in view of the following detailed description of some embodiments. It should be understood, however, that this summary, and the detailed description illustrate only some examples of various embodiments, and are not intended to be limiting to the invention as claimed.

BRIEF DESCRIPTION OF THE DRAWINGS

FIG. 1 illustrates a schematic of an immersion shrink tunnel.

FIG. 2 illustrates a schematic of a cascading shrink tunnel.

DETAILED DESCRIPTION OF SOME EMBODIMENTS

Figure 3:
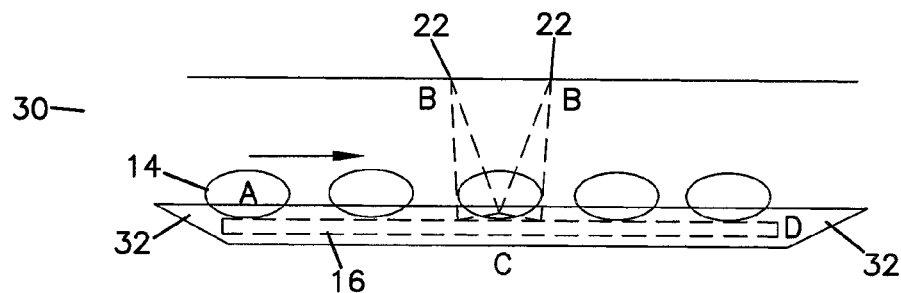
FIG. 3 illustrates a schematic of a cascading shrink tunnel with a bottom basin.

The present invention generally provides a method of controlling microorganisms on a food product by applying an antimicrobial composition to the food product or within the final food product package, packaging the food product, sealing the packaging, and, once the food product is sealed, applying activation energy to the sealed food product to further activate the antimicrobial composition inside the packaging. The invention also provides antimicrobial compositions to be used in conjunction with the method.

It is understood that the various embodiments of the present invention described herein may be combined to create a variety of unique embodiments and still remain within the scope of the present invention. Further, it is understood that the examples described herein may be used in conjunction with any of the embodiments described, unless stated otherwise.

DEFINITIONS

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Weight percent, percent by weight, % by weight, wt %, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4 and 5).

As used in this specification and the appended claims, the singular forms "a," "an," and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The use of the terms "antimicrobial" in this application does not mean that any resulting products are approved for use as an antimicrobial agent.

In one of several aspects, the present invention provides a method of controlling microorganisms on a food product by applying an antimicrobial composition to the food product or within the final food product packaging, and packaging the food product where the antimicrobial composition is not rinsed off of the food product, and once the packaging is sealed, applying activation energy to the sealed food product to activate the antimicrobial composition inside the packaging.

In certain embodiments, the method can be described in the following steps. First, the unpackaged food product enters the packaging area. Thereafter, an antimicrobial composition is applied in one of several ways to the food product either before, after, or substantially simultaneously with the packaging of the food product or in the final package before or after placing the food product in the final package. The packaging is sealed. Following the packaging and sealing, the sealed food product is exposed to a certain amount of activation energy for a period of time to activate the antimicrobial composition inside the packaging. Each of the steps will now be described in further detail.

Food Product

As used herein, the term "food product" or "food" refers to any food or beverage item that may be consumed by humans or mammals. Some non-limiting examples of a "food product" or "food" include the following: meat products including ready-to-eat ("RTE") meat and poultry products, processed meat and poultry products, cooked meat and poultry products, and raw meat and poultry products including beef, pork, and poultry products; fish products including cooked and raw fish, shrimp, and shellfish; produce including whole or cut fruits and vegetables and cooked or raw fruits and vegetables; pizzas; ready made breads and bread doughs; cheese; eggs and egg-based products, and pre-made food items such as pre-made sandwiches. The present invention is particularly useful for meat and poultry products. Specific examples of meat products including RTE deli or luncheon meats like turkey, ham, and roast beef, hot dogs and sausages. Additionally, the present invention can be used on bacon and pre-made, pre-assembled, or pre-packaged meals such as TV dinners and microwaveable entrees or meals.

Antimicrobial Composition

The present invention includes the application of an antimicrobial composition to the food product. The antimicrobial composition comprises at least one active antimicrobial ingredient. Additionally, the antimicrobial composition may also contain additional functional ingredients that aid in the function of the active antimicrobial ingredient, or impart a desired function or benefit.

There are a variety of active antimicrobial agents that may be used in the present invention. Some non-limiting examples of antimicrobial agents that may be used include fatty acids, $C_1$-$C_{12}$ dicarboxylic acids, percarboxylic acids, halogen compositions or interhalogens thereof, a halogen donor composition, chlorine dioxide, acidified sodium chlorite, ozone, a quaternary ammonium compound, an acid-anionic organic sulfonate or sulfate, a protonated carboxylic acid, or mixtures thereof. Some non-limiting examples of percarboxylic acids include: $C_1$-$C_{10}$ percarboxylic acids, diperoxyglutaric acid, diperoxyadipic acid, diperoxysuccinic acid, diperoxysuberic acid, diperoxymalonic acid, peroxylactic acid, peroxyglycolic acid, peroxyoxalic acid, peroxypyruvic acid, and mixtures thereof. Some non-limiting examples of halogen compounds and interhalogens thereof include: $Cl_2$, $Br_2$, $I_2$, ICl, IBr, ClBr, $ICl_2^-$, $IBr_2^-$, and mixtures thereof. Non-limiting examples of halogen donor compositions include: HOCl, HOI, HOBr, and the salts thereof, N-iodo, N-bromo, or N-chloro compounds; and N-bromosuccinamide, chloroisocyanuric acid, or 2-N-sodium-N-chloro-p-toluenesulfonamide. A non-limiting example of chlorine dioxide compositions includes chlorine dioxide generated from conventional chemical generators such as those sold by Prominent™ or preferably generated electrochemically using Halox™ generators. Some non-limiting examples of acidified sodium chlorite include the composition sold under the tradename SANOVA™, and commercially available from Ecolab Inc., (St. Paul, Minn.). A non-limiting example of ozone includes ozone generated electrochemically via high voltage discharge in oxygen. Non-limiting examples of quaternary ammonium compounds include: didecyldimethylammonium chloride, dioctyldimethylammonium chloride, octyldecyldimethylammonium chloride, alkyldimethylbenzylammonium chloride, and mixtures thereof. Non-limiting examples of acid-anionic organic sulfonates and sulfates include: acidic solutions of linear benzylsulfonic acid and sulfonated oleic acid. Non-limiting examples of protonated carboxylic acids include solutions with a pH less than 5 of one or more $C_1$-$C_{20}$ carboxylic acids. See U.S. Pat. Nos. 4,051,058, 4,051,059, 5,200,189, 5,200,198, 5,489,434, 5,718,910, 5,314,687, 5,437,868 for further discussion on peracid chemistry and the formation of an antimicrobial agent formulation. These patents are incorporated herein by reference in their entirety.

The active antimicrobial agent may include one active antimicrobial agent or a combination of more than one active antimicrobial agent. The active antimicrobial agent is preferably a GRAS (generally recognized as safe) or food grade composition. Some non-limiting examples of preferred active antimicrobial agents include fatty acids, acidified sodium chlorite, and peroxyacids such as peroxyacetic acid and peroxyoctanoic acid. The active antimicrobial agent is most preferably octanoic acid.

When applying the antimicrobial composition to the food product, the antimicrobial composition preferably contains from about 0.001 wt. % to about 10 wt. % of the active antimicrobial agent, from about 0.005 wt. % to about 5 wt. % of the active antimicrobial agent, and from about 0.01 wt. % to about 2 wt. % of the active antimicrobial agent. It is understood that different antimicrobial agents have different activities. A person skilled in the art will be able to select the antimicrobial composition and concentration to achieve the desired result.

As previously discussed, the antimicrobial composition may include additional functional ingredients in addition to the active antimicrobial agent. Examples of additional functional ingredients that may be included along with the active antimicrobial agent include oxidizers, carriers, chelating agents, hydrotropes, thickening and/or gelling agents, foaming agents, film-forming agents, surfactants, coupling agents, acidulants, potentiators, flavoring aids, fragrance, dye, and the like. Any additional functional ingredient is preferably a GRAS or food grade ingredient since the antimicrobial composition is preferably applied to the food product. Examples of preferred antimicrobial compositions are described in greater detail in the co-pending patent application entitled, ANTIMICROBIAL COMPOSITIONS FOR USE ON FOOD PRODUCTS, filed concurrently herewith with Ser. No. 11/459,069, the entire disclosure of which is incorporated by reference herein. A person of ordinary skill in the art will be able to formulate compositions depending on the desired active antimicrobial agent, and the desired physical properties so that the various ingredients do not adversely affect each other.

The antimicrobial composition may have a range of physical forms. For example, the antimicrobial composition may be a solid, liquid, structured or thickened liquid or gel, foam, pellet, prill, or a powder. Further, the antimicrobial composition may be a part of a dissolvable film such as polyvinylalcohol (PVA) or cellulose film, or the antimicrobial composition may be blown or extruded with a film, impregnated in a film, or coated on a film. Further, the antimicrobial composition may be formulated as a concentrate composition or a ready-to-use composition. A concentrate composition is often less expensive to ship than a ready-to-use composition. The concentrate refers to the composition that is diluted to form the ready-use-composition. The ready-to-use composition refers to the composition that is applied to the food product.

In certain embodiments, it may be desirable for the active antimicrobial agent to have a lasting effect once the food product is packaged and continue to provide a suppression of growth. For example, it may be desirable under Alternative 1 for the antimicrobial composition to continue to provide an antimicrobial effect over the entire shelf life of the food product and prevent the growth of microorganisms. In other embodiments, it may be desirable for the active antimicrobial agent to cease having an antimicrobial effect shortly after the activation energy is applied.

Application of the Antimicrobial Composition

The antimicrobial composition may be applied to the food product prior to, after, or substantially simultaneously with the packaging of the food product.

The antimicrobial composition may be applied to the food product in several ways. In some embodiments, the antimicrobial composition may be applied directly to the food product in a number of ways including spraying, misting, rolling, and foaming the antimicrobial composition directly onto the food product and the like, and immersing the food product in the antimicrobial composition. The antimicrobial composition may be applied in an injection such as in an injection solution, or the antimicrobial composition may be applied as part of a marinade or tenderizer that is applied to the food product.

In some embodiments, the antimicrobial composition may be indirectly applied to the food product. The antimicrobial composition may be applied to the packaging prior to inserting the food product into the packaging or prior to applying the packaging to the food product. The antimicrobial composition then contacts the food product when the food product is packaged. As used herein, a "packaged food product" means a food product that has been placed in packaging but not yet sealed. The antimicrobial composition may be applied to the packaging after the food product has been inserted into the packaging or after applying the packaging to the food product (e.g., the antimicrobial composition may be squirted or otherwise introduced into the packaging after the food has been placed in the packaging but prior to sealing the packaging). The antimicrobial composition may be applied to the food product substantially simultaneously with the packaging of the food product. Additionally, it has already been discussed that food packaging or food casing (e.g., hot dog or sausage casing) may be coated, treated, or impregnated with the antimicrobial composition, and the antimicrobial composition is applied to the food product when the food product is placed inside the packaging or casing.

When using the food casing to apply the antimicrobial composition, the antimicrobial composition may be applied to the food product, specifically the hot dog or sausage, by coating, treating, or impregnating the casing with the antimicrobial composition prior to stuffing the casing with the meat product and prior to cooking. While not wanting to be bound to any scientific theory, it is believed that the moisture content of the food product will release the antimicrobial composition from the casing and allow it to coat the surface of the food product. Once the food product is cooked and the casing is removed, the antimicrobial composition is left on the surface of the food product to provide an antimicrobial barrier. The food product is then packaged and the antimicrobial composition is then activated using activation energy.

Packaging

The present invention relates specifically to packaged food products where the packaging is sealed and activation energy is applied to the sealed food product. As previously discussed, a "packaged food product" refers to a food product that has been placed inside packaging but not yet sealed. The above described food products may be packaged in a variety of ways including vacuum packaging, shrink wrapping, and modified atmosphere packaging. Further, the food products may be packaged in a variety of packaging materials including bags, pouches, films such as shrink films and non-shrink films, trays, bowls, clam shell packaging, web packaging, and hot dog/frankfurter packaging. The present invention is especially useful in conjunction with the shrink wrap packaging that is used in a shrink wrap process.

As discussed above, the packaging of the food product may occur prior to, after, or substantially simultaneously with the application of the antimicrobial composition. However, in the cases where the antimicrobial composition is applied first, and the packaging takes place in a separate step, the packaging step preferably takes place no more than 30 minutes after the application of the antimicrobial composition, no more than 10 minutes after the application of the antimicrobial composition, no more than 60 seconds after the application of the antimicrobial composition, and no more than 5 seconds after the application of the antimicrobial composition. By reducing the amount of time in between the application of the antimicrobial composition to the food product, and when the food product is placed inside the packaging, the likelihood that the food product will be re-contaminated in between the two steps is reduced.

Activation Energies

The method of the present invention includes the application of activation energy to a product to activate the antimicrobial composition. When using activation energy, enough energy must be applied to the antimicrobial composition for a sufficient period of time in order to activate it. The exact amount of energy and length of time may vary depending on the antimicrobial composition, the food product, and the method of energy application. A person skilled in the art will be able to select the desired activation energy, and duration depending on the antimicrobial composition and food product.

Non-limiting examples of suitable activation energies that may be used with all of the methods described herein include heat, pressure, ultraviolet light, infrared light, ultrasonic, radio frequency, microwave radiation, gamma radiation, and the like. Preferred activation energies include heat, pressure, and microwave radiation. It is understood that different activation energies will have different parameters (i.e. amount, duration). A person skilled in the art will be able to select the activation energy and parameters to achieve he desired result.

When heat is used as the activation energy, the heat may be applied in several ways including but not limited to hot water, steam, and hot air.

When using heat as the activation energy, the temperature of the heat is preferably from about 160° F. (71° C.) to about 210° F. (99° C.), from about 180° F. (82° C.) to about 200° F. (93° C.), and from about 190° F. (88° C.) to about 200° F. (93° C.). It is understood that the temperatures provided herein describe the temperature of the composition (e.g., the temperature of the water or air) being applied to the packaged food product, and not the temperature of the food product. For other activation energies described herein, the activation energy used should preferably correspond to the energy applied using heat at the above temperatures.

Non-limiting examples of application time for the above described activation energies, that may be used in conjunction with all of the methods described herein, include about less than 60 seconds, from about 1 to about 60 seconds, from about 2 to about 20 seconds, and from about 3 to about 10 seconds.

It is understood that the heat activation of the present method is different from thermal surface treatment of a food product (e.g., hot water or pasteurization). In a thermal surface treatment process, a thermal source, such as hot water or steam, is applied to a food product either directly to the surface of the food product, or indirectly, by applying heat to the packaging surface. Typical thermal surface treatments apply high temperature heat and/or long exposure times in an effort to reduce the presence of microorganisms (e.g., provide a "lethal" amount of heat to kill microorganisms). Further, thermal surface treatments require large equipment capital investments and take up a lot of space in a processing facility. Finally, thermal surface treatments have negative organoleptic effects on the food product including color and odor changes and cause increase in liquid purge volumes on meat products. The heat activation of the present invention provides little, if any, reduction in the level of microorganisms (e.g., a "sub-lethal" amount of heat) because the purpose of the addition of heat is to activate the applied antimicrobial composition which in turn reduces the level of microorganisms, not to use the heat itself to reduce the level of microorganisms. Additionally, the heat used in the method of the present invention does not impact organoleptic properties or purge volumes.

While not wanting to be bound by any scientific theory, it is believed that the present invention works in one of two ways. First, energy is known to increase the kinetics of reactions responsible for cell death. Accordingly, the application of energy in the present invention to food products treated with an antimicrobial composition may increase the efficacy of the antimicrobial composition based on this principle. Second, it is known that the phospholipids in the bilayer of bacterial membranes undergo radical changes in physical state over narrow temperature ranges, sometimes referred to as phase transition temperatures or melting temperatures. Similar conformational and/or denaturative changes take place in the intracellular organelles. It is believed that the present invention takes advantage of these phenomenons by exposing microorganisms to energy in order to reach or pass the phase transition temperature and creating a liquid crystal conformation in the bilayer in which the bilayer becomes more permeable to the antimicrobial composition. Further, the targeted organelles within the microorganism also exhibit conformational changes that make them more susceptible to the antimicrobial composition.

In certain embodiments, the method of the present invention may be carried out in a shrink tunnel using heat as the activation energy, and shrink-wrap film as the packaging. In the shrink wrapping process, a food product is vacuum-packaged in a packaging film that is designed to shrink when heated and form a film around the food product. Once vacuum-packaged, the packaged food product travels through a shrink tunnel that applies heat to the packaging to shrink the packaging around the food product. The heat may be applied in several ways including immersion into a heated bath, or through cascading hot water.

When the present invention is used in conjunction with a shrink tunnel, the present invention may use standard shrink tunnel equipment, or modified shrink tunnel equipment. Some non-limiting examples of shrink tunnels are described in FIGS. 1-5. It is understood that the present invention may be used in any shrink tunnel including variations of the shrink tunnels described in FIG. 1-5 and that the shrink tunnels described in FIGS. 1-5 are intended to be exemplary. When referring to the figures, like structures and elements shown throughout are indicated with like reference numerals.

FIG. 1 illustrates a schematic of an immersion shrink tunnel generally (10). The immersion shrink tunnel (10) is full of heated water. In the immersion shrink tunnel (10), the food product (14) enters the immersion shrink tunnel (10) full of heated water on a conveyor (16). In the method of the present invention, as the food product (14) is immersed in the heated water, the heated water shrinks excess packaging film while activating an antimicrobial composition applied to the food product.

FIG. 2 illustrates a schematic of a cascading shrink tunnel generally (20). The cascading shrink tunnel (20) includes a conveyor (16). The cascading shrink tunnel (20) is fitted with multiple upper cascading water streams (22) that spray heated water on the top of the food product (14). From below the conveyor a jet of heated water (24) sprays the bottom of the food product (14). In the method of the present invention, the food product (14) enters the shrink tunnel (20) on the conveyor (16) and the water streams (22) and jet (24) spray heated water on the food product (14) causing the excess packaging film to shrink while activating an antimicrobial composition applied to the food product.

FIG. 3 illustrates a schematic of a cascading shrink tunnel with a bottom basin generally (30). The cascading shrink tunnel (30) includes a conveyor (16), multiple upper cascading water streams (22), and a bottom basin (32). The bottom basin (32) functions to collect heated water from the cascading water streams (22) and ensure that the bottom of the food product (14) is covered by heated water. In the method of the present invention, the food product (14) enters the shrink tunnel (30) on the conveyor (16) and the water streams (22) spray heated water on the food product (14) as the food product (14) travels through the bottom basin (32) that is full of heated water from the cascading water streams (22). The heated water shrinks excess packaging film while activating an antimicrobial composition applied to the food product.

Figure 4:
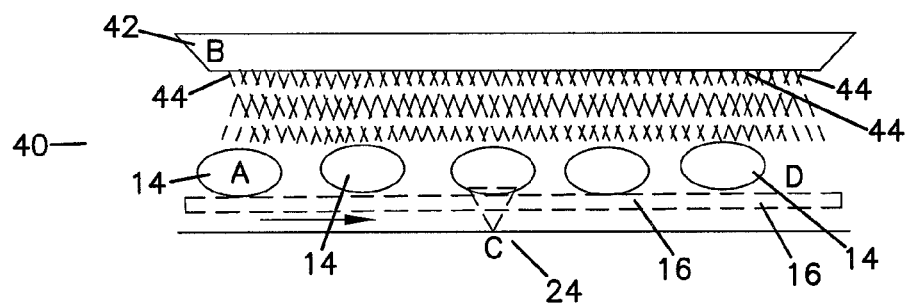
FIG. 4 illustrates a schematic of a drip flow shrink tunnel with a bottom jet.

FIG. 4 illustrates a schematic of a drip flow shrink tunnel with a bottom jet generally (40). The drip flow shrink tunnel includes a conveyor (16) and an upper drip pan (42) that is full of heated water. The upper drip pan (42) includes many small holes (44) for allowing the heated water to flow out of the drip pan (42) and onto the food product (14). The advantage of this type of shrink tunnel is the extended exposure time of the food product (14) to heated water in comparison to the cascading shrink tunnel described in FIG. 2. From below, a jet of heated water (24) sprays the food product (14) with heated water. In the method of the present invention, the food product (14) enters the shrink tunnel (40) on a conveyor (16) and is exposed to heated water from the drip pan (42) and from the jet of heated water (24). The heated water shrinks excess packaging film while activating an antimicrobial composition applied to the food product.

Figure 5:
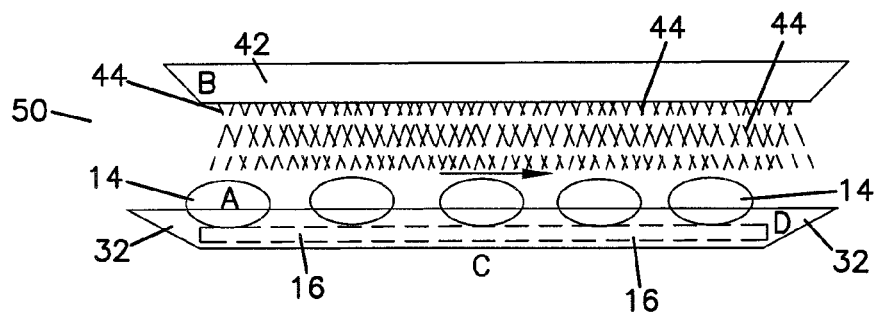
FIG. 5 illustrates a schematic of a drip flow shrink tunnel with a bottom basin.

FIG. 5 illustrates a schematic of a drip flow shrink tunnel with a bottom basin generally (50). The shrink tunnel (50) includes a conveyor (16), an upper drip pan (42) that has many small holes (44) for allowing the heated water in the drip pan (42) to flow through, and a bottom basin (32) that is full of heated water. This shrink tunnel also has the advantage of an extended exposure time to heated water in comparison to the cascading shrink tunnel described in FIG. 2. In the method of the present invention, the food product (14) enters the shrink tunnel (50) on a conveyor (16). The food product (14) is exposed to heated water from the upper basin (42) through the small holes (44), and from the lower basin (32) that is full of heated water. The heated water shrinks excess packaging film while activating an antimicrobial composition applied to the food product.

For a more complete understanding of the invention, the following examples are given to illustrate some embodiments. These examples and experiments are to be understood as illustrative and not limiting. All parts are by weight, except where it is contrarily indicated.

EXAMPLES

Example 1

The following is an example of an acidified sodium chlorite (ASC) composition used in the method of the present invention where the ASC composition is activated by passage of the food product through a simulated shrink tunnel.

For this example, sodium chlorite was diluted in water to about 500 ppm to about 1,200 ppm. The pH of the sodium chlorite solution was then adjusted using a GRAS acid such as citric acid or sodium bisulfate to about 2.4 to about 2.6.

TABLE 1

| Acidified Sodium Chlorite Composition | |
|---|---|
| Level (ppm) | Raw Material |
| QS | Water |
| 1,200 ppm | Sodium Chlorite |
| 6,000 ppm | Citric Acid |

Final Solution pH ~2.5

An equal-part mixture of five strains of *L. monocytogenes* including ATCC 19112, ATCC 19114, ATCC 19115, ATCC 7644, and NCTC 10890 suspended in phosphate buffered dilution water, was used as the inoculum. 0.1 milliliters of the inoculum was placed onto a RTE turkey breast, spread with a sterile bent glass rod, followed by storage at 5° C. for 10 minutes to allow for bacterial attachment. RTE turkey breasts were then sprayed with the antimicrobial composition described in Table 1 for 15 seconds. In this example, the volume of the antimicrobial composition applied to each RTE turkey breast was about 15 milliliters. The turkey breasts were placed with bags. The bags were immediately vacuum-packaged, and submerged in 200° F. water for 15 seconds to simulate passage through a shrink tunnel. The bags were then submerged in a 2° C. water bath for ≥1 minute. Two replicates were completed per treatment. The samples were stored at 5° C. for up to 7 days before being analyzed for populations of L. monocytogenes. Fifty milliliters of University of Vermont broth were added to each bag. The RTE turkey breasts were tumbled to recover cells. The resulting suspension was plated in Modified Oxford Medium Agar and the plates were incubated at 35° C. for 72 hours prior to enumeration of L. monocytogenes.

TABLE 2

Efficacy of ASC and Heat on L. monocytogenes on Packaged, RTE Turkey

| Treatment | Heat Exposure (sec) | 1 day | | 7 days | |
|---|---|---|---|---|---|
| | | Average $Log_{10}$ CFU/sample | Average $Log_{10}$ Reduction | Average $Log_{10}$ CFU/sample | Average $Log_{10}$ Reduction |
| Water | 0 | 7.61 | NA | 9.02 | NA |
| ASC | 0 | 7.46 | 0.15 | 8.24 | 0.78 |
| | 15 | 6.48 | 1.13 | 6.82 | 2.20 |

Seven days following treatment, ASC resulted in a 0.78 log reduction of L. monocytogenes. However, the activation of ASC reduced L. monocytogenes populations by 2.20 logs within the food product. It has been published that naturally occurring L. monocytogenes contamination levels in RTE meat products is generally low (about <1 CFU/g). Gombas, D. E., et al. (2003). Survey of Listeria monocytogenes in Ready-to-Eat Foods. Journal of Food Protection (66). 559-569. Thus, once activated, the antimicrobial composition renders the RTE product essentially free of Listeria monocytogenes contamination. Activation of ASC with heat led to a reduction in populations of L. monocytogenes which meets FSIS requirements of a post-lethality treatment as described in FSIS Form 10,240-1.

Example 2

The following is an example of an octanoic acid composition used in the method of the present invention where the octanoic acid composition is activated by passage of the food product through a simulated shrink tunnel.

For this example, a solution of 1,000 ppm to about 10,000 ppm octanoic acid, from about 1.0% to about 4.0% ethylene oxide/propylene oxide co-polymer (Pluronic F108), and about 2.0 to about to about 6.0% propylene glycol was adjusted to pH 1.0 with any GRAS acid such as phosphoric acid.

TABLE 3

Octanoic Acid Composition

| Level (Wt. %) | Raw Material |
|---|---|
| 88.15 | Water |
| 2.85 | Pluronic F108 |
| 5.00 | Propylene Glycol |
| 3.00 | Phosphoric Acid (75%) |
| 1.00 | Octanoic Acid |

Final Solution pH ~1.18

An equal-part mixture of five strains of L. monocytogenes including ATCC 19112, ATCC 19114, ATCC 19115, ATCC 7644, and NCTC 10890 suspended in phosphate buffered dilution water was used as the inoculum. 0.1 milliliters of the inoculum was placed onto each RTE turkey breast, spread with a sterile bent glass rod, followed by storage at 5° C. for 10 minutes to allow for bacterial attachment. RTE turkey breasts were then sprayed with the antimicrobial composition described in Table 3 for 15 seconds. In this example, the volume of the antimicrobial composition applied to each RTE turkey breast was about 15 milliliters. The turkey breasts were placed into bags. The bags were immediately vacuum-packaged, and submerged in 200° F. water for 15 seconds to simulate passage through a shrink tunnel. The bags were then submerged in a 2° C. water bath for ≥1 minute. Two replicates were completed per treatment. The samples were stored at 5° C. for 24 hours before analyzed for populations of L. monocytogenes. Fifty milliliters of University of Vermont broth were added to each bag. The RTE turkey breasts were tumbled to recover cells. The resulting suspension was plated in Modified Oxford Medium Agar and the plates were incubated at 35° C. for 72 hours prior to enumeration of L. monocytogenes.

TABLE 4

Efficacy of Octanoic Acid and Heat on L. monocytogenes on, RTE Turkey

| Treatment | Heat Exposure (sec) | Average $Log_{10}$ CFU/sample | Average $Log_{10}$ Reduction |
|---|---|---|---|
| Water | 0 | 7.61 | NA |
| 1% Octanoic Acid | 0 | 6.41 | 1.20 |
| | 15 | 5.57 | 2.04 |

Following treatment with 1% octanoic acid, a 1.20 log reduction of L. monocytogenes resulted. However, the activation of octanoic acid reduced L. monocytogenes populations by 2.04 logs within the food product. It has been published that naturally occurring L. monocytogenes contamination levels in RTE meat products is generally low (about <1 CFU/g). Thus, once activated, the antimicrobial composition renders the RTE product essentially free of Listeria monocytogenes contamination. This example shows that octanoic acid meets FSIS requirements of a post-lethality treatment as described in FSIS Form 10,240-1.

Example 3

The following is an example of a peroxyacid composition using the method of the present invention where the peroxyacid composition is activated by passage of the food product through a simulated shrink tunnel.

For this example, a solution of about 100 to about 400 ppm peroxyacetic acid, about 10 to about 50 ppm peroxyoctanoic acid, about 75 to about 300 ppm octanoic acid, and about 32 to about 150 ppm hydrogen peroxide was adjusted to about pH 1.5 with phosphoric acid.

TABLE 5

Peroxyacid Composition

| Level (ppm) | Raw Material |
|---|---|
| 775 | Acidic Acid |
| 200 | Peroxyacetic Acid |
| 140 | Octanoic Acid |
| 75 | Hydrogen Peroxide |
| 25 | Peroxyoctanoic Acid |
| 10 | HEDP |

Final Solution pH ~1.5

An equal-part mixture of five strains of *L. monocytogenes* including ATCC 19112, ATCC 19114, ATCC 19115, ATCC 7644, and NCTC 10890 suspended in phosphate buffered dilution water, was used as the inoculum. 0.1 milliliters of the inoculum was placed onto each RTE roast beef sample, spread with a sterile bent glass rod, followed by storage at 5° C. for 10 minutes to allow for bacterial attachment. RTE roast beef samples were then sprayed with the antimicrobial composition described in Table 5 for 15 seconds. In this example, the volume of the antimicrobial composition applied to each RTE roast beef sample was about 15 milliliters. The roast beef samples were placed into bags. The bags were immediately vacuum-packaged, and submerged in 200° F. water for 15 seconds to simulate passage through a shrink tunnel. The bags were then submerged in a 2° C. water bath for ≥1 minute. Two replicates were completed per treatment. The samples were stored at 5° C. for 24 hours before analyzed for populations of *L. monocytogenes*. Fifty milliliters of University of Vermont broth were added to each bag. The RTE roast beef samples were tumbled to recover cells. The resulting suspension was plated in Modified Oxford Medium Agar and the plates were incubated at 35° C. for 72 hours prior to enumeration of *L. monocytogenes*.

TABLE 6

Efficacy of Peroxyacid and Heat on
*L. monocytogenes* on RTE Roast Beef

| Treatment | Heat Exposure (sec) | Average $Log_{10}$ CFU/sample | Average $Log_{10}$ Reduction |
|---|---|---|---|
| Water | 0 | 8.72 | NA |
| Peroxyacid | 0 | 8.13 | 0.59 |
| Antimicrobial | 15 | 7.74 | 0.98 |

Following treatment with peroxyacid, a 0.59 log reduction of *L. monocytogenes* resulted. However, the activation of peroxyacid reduced *L. monocytogenes* populations by 0.98 logs within the food product. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination.

Example 4

The following is an example of an ASC composition and an octanoic acid composition together used in the method of the present invention where both compositions are activated by passage of the food product through a simulated shrink tunnel.

For this example sodium chlorite was diluted in water to about 500 ppm to about 1,200 ppm. The pH of the sodium chlorite was then adjusted using any GRAS acid such as citric acid or sodium bisulfate to about 2.4 to about 2.6. The second solution of octanoic acid was prepared containing from about 1,000 ppm to about 10,000 ppm of octanoic acid, from about 1.0 to about 4.0 wt. % ethylene oxide/propylene oxide copolymer (Pluronic F108), and about 2.0 to about 6.0 wt. % propylene glycol. The octanoic acid solution was adjusted to pH 2.0 with any GRAS acid such as phosphoric acid.

TABLE 7

Acidified Sodium Chlorite Composition

| Level (ppm) | Raw Material |
|---|---|
| QS | Water |
| 1200 | Sodium Chlorite |
| 6000 | Citric Acid |

Final Solution pH ~2.5

TABLE 8

Octanoic Acid Composition

| Level (Wt. %) | Raw Material |
|---|---|
| 90.95 | Water |
| 2.85 | Pluronic F108 |
| 5.00 | Propylene Glycol |
| 0.20 | Phosphoric Acid (75%) |
| 1.00 | Octanoic Acid |

Final Solution pH ~2.0

An equal-part mixture of five strains of *L. monocytogenes* including ATCC 19112, ATCC 19114, ATCC 19115, ATCC 7644, and NCTC 10890, suspended in phosphate buffered dilution water, was used as the inoculum. 0.1 milliliters of the inoculum was placed onto each RTE turkey breast, spread with a sterile bent glass rod, followed by storage at 5° C. for 10 minutes to allow for bacterial attachment. The ASC solution was spray applied to the surface of the RTE product. Immediately after, the turkey breasts were placed into bags. The octanoic acid solution was then applied to the RTE product in the bag. In this example, the volume of each of the antimicrobial composition applied to each RTE turkey breasts was about 15 milliliters. The bags were immediately vacuum-packaged, and submerged in 200° F. water for 2 or 15 seconds to simulate passage through a shrink tunnel. The bags were then submerged in a 2° C. water bath for ≥1 minute. Two replicates were completed per treatment. The samples were stored at 5° C. for up to 14 days before analyzed for populations of *L. monocytogenes*. Fifty milliliters of University of Vermont broth were added to each bag. The RTE turkey breasts were tumbled to recover cells. The resulting suspension was plated in Modified Oxford Medium Agar and the plates were incubated at 35° C. for 72 hours prior to enumeration of *L. monocytogenes*.

TABLE 9

Efficacy of ASC and Octanoic Acid and
Heat on *L. monocytogenes* on RTE Turkey

| | | 1 day of storage | | 14 days of storage | |
|---|---|---|---|---|---|
| Treatment | Heat Exposure (sec) | Average $Log_{10}$ CFU/ sample | Average $Log_{10}$ Reduction | Average $Log_{10}$ CFU/sample | Average $Log_{10}$ Reduction |
| Untreated | 2 | 4.09 | NA | 5.19 | NA |
| ASC | 2 | 2.15 | 1.94 | 2.05 | 3.14 |
| | 15 | <1.70[a] | >2.39 | <1.70 | >3.49 |
| ASC & | 2 | 1.94 | 2.15 | <1.70 | >3.49 |
| Octanoic Acid | 15 | <1.70 | >2.39 | <1.70 | >3.49 |

[a] Limit of detection of the assay was 1.70 $log_{10}$ CFU/sample

Activation of both ASC and octanoic acid with heat resulted in the absence of recoverable colonies on RTE turkey breasts following 14 days of storage. Thus, once activated, the antimicrobial compositions substantially suppress the growth of *L. monocytogenes* on treated RTE foods. This example shows that the use of ASC and octanoic acid meets FSIS requirements of a post-lethality treatment as described in FSIS Form 10,240-1 and may meet the requirements of an antimicrobial agent or process which suppresses the growth of *L. monocytogenes* as described in FSIS Form 10,240-1.

Example 5

The following example determined the efficacy of an octanoic acid solution at killing *Listeria monocytogenes* on turkey frankfurters when used in the method of the present invention where the octanoic acid composition was activated by simulating passage of the food product through a simulated shrink tunnel.

For this example, an aqueous solution of 930 ppm octanoic acid prepared with the following composition: 930 ppm octanoic acid, 830 ppm 1-hydroxyethylidene-1,1-diphosphonic acid (Dequest 2010), 1,250 ppm 1-octanesulfonae and acidified to about pH 1.5 using phosphoric acid. An equal-part mixture of five strains of *L. monocytogenes* including ATCC 19112, ATCC 19114, ATCC 19115, ATCC 7644, and NCTC 10890, suspended in phosphate buffered dilution water, was used as the inoculum. 0.125 milliliters of the inoculum was pipetted onto each turkey frankfurter within a sterile polyethylene bag. The frankfurters were stored at 10° C. for 10 minutes to allow for bacteria attachment. 1 milliliter of the octanoic acid formula (or sterile water for the control) was added to each bag. The bags were vacuum-packaged, and submerged in 200° F. water for up to 15 seconds to simulate passage through a shrink tunnel. The bags were then submerged in a 2° C. water bath for ≥1 minute. Two replicates were completed per treatment. The samples were stored at 5° C. for about 24 hours before analyzed for populations of *L. monocytogenes*. Fifteen milliliters of University of Vermont broth were added to each bag. The frankfurters were massaged for 1 minute to recover cells. The resulting suspension was plated in Modified Oxford Medium Agar and the plates were incubated at 35° C. for 72 hours prior to enumeration of *L. monocytogenes*.

TABLE 10

Efficacy of 930 ppm Octanoic Acid in Killing
*L. monocytogenes* on Turkey Frankfurters

| Treatment Solution | Heat Exposure (sec) | Average $Log_{10}$ CFU/sample | Average $Log_{10}$ Reduction Vs. Control |
|---|---|---|---|
| Water (control) | None | 7.20 | Not Applicable |
| 940 ppm Octanoic Acid | None | 6.81 | 0.39 |
|  | 5 | 5.40 | 1.80 |
|  | 15 | 5.32 | 1.88 |

The treatment of turkey frankfurters with 930 ppm octanoic acid without heat resulted in a 0.39 log reduction of *L. monocytogenes*. However, the activation of octanoic acid with heat led to up to a 1.88 log reduction. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows that octanoic acid meets FSIS requirements of a post-lethality treatment as described in FSIS Form 10,240-1.

Example 6

The following example determined the efficacy of 1.0% octanoic acid solution at reducing *L. monocytogenes* on RTE oven roasted turkey breasts where the octanoic acid was activated by simulating passage of the food product through a simulated immersion shrink tunnel. For this example an aqueous solution of 1% octanoic acid comprised of 1% octanoic acid and 5% Polysorbate 80 as a coupler then acidified to pH 2.0 using 0.3% phosphoric acid. An equal-part mixture of five strains of *L. monocytogenes*, including ATCC 19112, ATCC 19114, ATCC 19115, ATCC 7644, and NCTC 10890, suspended in a phosphate buffered dilution water, was used as the inoculum. Sample surfaces were spot-inoculated with 50 microliters of the inoculum. The inoculum was spread using a sterile bent glass rod. Inoculated samples were stored at 5° C. for 30 minutes before treatment to allow for bacterial attachment. The inoculated turkey samples were transferred to shrink bags. Fifteen milliliters of the octanoic acid formula were added to bags which were immediately vacuum-packaged and submerged in water heated to 190° F. for 10 seconds (treated samples) or 2 seconds (untreated control samples) prior to being placed into a 2° C. water bath for ≥1 minute. Five replicates were completed per treatment. The samples were stored at 5° C. for 24 hours before analyzed for populations of *L. monocytogenes*. Fifty milliliters of University of Vermont broth were added to each bag. The turkey samples were tumbled for 50 rotations and the resulting suspension was plated in Modified Oxford Medium Agar. Plates were incubated at 35° C. for 48 hours before the pathogen was enumerated.

TABLE 11

Efficacy of 1.0% Octanoic Acid in *L. monocytogenes*
on RTE Oven Roasted Turkey Breasts

| Treatment Solution | Average $Log_{10}$ CFU/sample | $Log_{10}$ Reduction Vs. Control |
|---|---|---|
| Untreated Control | 4.91 | Not Applicable |
| 1.0% Octanoic Acid | 2.49 | 2.42 |

The treatment of the oven roasted turkey breasts with 1.0% octanoic acid resulted in a 2.42 log reduction of *L. monocytogenes*. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows that octanoic acid meets FSIS requirements of a post-lethality treatment as described in FSIS Form 10,240-1.

Example 7

The following example determined the efficacy of 1.0% solution of octanoic acid against *L. monocytogenes* on turkey ham, where the octanoic acid composition was activated by simulating passage of the food product through a simulated shrink tunnel. For this example the same aqueous solution used in Example 6 was used. An equal-part mixture of five strains of *L. monocytogenes* including ATCC 19112, ATCC 19114, ATCC 19115, ATCC 7644 and NCTC 10890, suspended in phosphate buffered dilution, water, was used as the inoculum. Sample surfaces were spot-inoculated with 50 microliters of the inoculum. The inoculum was spread using a sterile bent glass rod. Inoculated samples were stored at 5° C. for 30 minutes before treatment to allow for bacterial attachment. Inoculated turkey ham samples were transferred to shrink bags. Ten milliliters of the octanoic acid composition were added to the bags which were immediately vacuum-packaged and submerged in water heated to a 190° F. for 10 seconds (treated samples) or 2 seconds (untreated control samples) prior to being placed into a 2° C. water bath for ≥1 minute. Five replicates were completed per treatment. The samples were stored at 5° C. for 24 hours before analyzed for populations of L. monocytogenes. Fifty milliliters of University of Vermont broth were added to each bag. Turkey ham samples were tumbled for 50 rotations and the resulting suspension was plated in Modified Oxford Medium Agar. Plates were incubated at 35° C. for 48 hours before the pathogen was enumerated.

TABLE 12

Efficacy of 1.0% Octanoic Acid in Killing
L. monocytogenes on Turkey Ham

| Treatment Solution | Average Log$_{10}$ CFU/sample | Log$_{10}$ Reduction Vs. Control |
|---|---|---|
| Untreated Control | 4.86 | Not Applicable |
| 1.0% Octanoic Acid | 2.52 | 2.34 |

The treatment of turkey ham with 1.0% octanoic acid resulted in a 2.34 log reduction of L. monocytogenes. It has been published that naturally occurring L. monocytogenes contamination levels in RTE meat products is generally low (about <1 CFU/g). Thus, once activated, the antimicrobial composition renders the RTE product essentially free of Listeria monocytogenes contamination. This example shows that octanoic acid meets FSIS requirements of a post-lethality treatment as described in FSIS Form 10,240-1.

Example 8

The following example determined the efficacy of a 1.0% octanoic acid solution against L. monocytogenes on roast beef where the octanoic acid composition was activated by passage of the food product through a simulated shrink tunnel. For this example an aqueous solution of 1% octanoic acid using 2.85% ethylene oxide/propylene oxide co-polymer (Pluronic F108) as a coupler, was prepared and acidified pH 2.0 using 0.3% phosphoric acid. An equal-part mixture of five strains of L. monocytogenes including ATCC 19112, ATCC 19114, ATCC 19115, ATCC 7644, and NCTC 10890, suspended in phosphate buffered dilution, water was used as the inoculum. Roast beef surfaces were spot-inoculated with 50 microliters of the inoculum. The inoculum was spread using a sterile bent glass rod. Inoculated roast beef samples were stored at 5° C. for 30 minutes before treatment to allow for bacterial attachment. The roast beef samples were treated with octanoic acid via a spray which resulted in retention of approximately 15 milliliters of the octanoic acid formula to each treated sample. Roast beef samples were placed in shrink bags which were immediately vacuum-packaged and submerged in water heated to 200° F. for 2, 6, or 10 seconds (treated samples) or 2 seconds (untreated control samples) prior to being placed into a 2° C. water bath for ≥1 minute. Ten replicates were completed per treatment. Samples were stored at 5° C. for 24 hours before being analyzed for population of L. monocytogenes. Fifty milliliters of University of Vermont broth were added to each bag. Roast beef samples were tumbled for 50 rotations and the resulting suspension was plated in Modified Oxford Medium Agar. Plates were incubated at 35° C. for 48 hours before the pathogen was enumerated.

TABLE 13

Efficacy of 1.0% Octanoic Acid in Killing
L. monocytogenes on Roast Beef

| Treatment Solution | Heat Exposure (seconds) | Average Log$_{10}$ CFU/sample | Log$_{10}$ Reduction Vs. Control |
|---|---|---|---|
| Untreated Control | 2 | 4.76 | Not Applicable |
| 1.0% Octanoic Acid | 2 | 3.02 | 1.74 |
|  | 6 | 2.73 | 2.03 |
|  | 10 | 2.51 | 2.26 |

The results of the study clearly demonstrate the increase in efficacy following activation of octanoic acid within the food product. Activation of 1% octanoic acid with heat reduced populations of the pathogen by up to 2.26 logs. It has been published that naturally occurring L. monocytogenes contamination levels in RTE meat products is generally low (about <1 CFU/g). Thus, once activated, the antimicrobial composition renders the RTE product essentially free of Listeria monocytogenes contamination. This example shows that octanoic acid meets FSIS requirements of a post-lethality treatment as described in FSIS Form 10,240-1.

Example 9

The following example determined the efficacy of a 1.0% octanoic acid solution against L. monocytogenes on turkey breasts and roast beef where the octanoic acid composition was activated by passage through a conventional cascading shrink tunnel.

For this example an aqueous solution of 1% octanoic acid using 3% Polysorbate 20 as a coupler, was prepared and acidified pH 2.0 using 0.3% phosphoric acid. An equal-part mixture of five strains of L. monocytogenes, including Scott A (serotype 4b, human isolate), H7750 (not serotyped, frankfurter isolate), AC33 (not serotyped, cooked ham isolate), LM108M (serotype 1/2b, salami isolate), and F6854 (serotype 1/2a, frankfurter isolate), suspended in phosphate buffered dilution water were used. Turkey breast and roast beef surfaces were spot-inoculated with 50 microliters of the inoculum. The inoculum was spread using a sterile bent glass rod. Inoculated RTE products were stored at 5° C. for 30 minutes before treatment to allow for bacterial attachment. RTE samples were placed in shrink bags. The RTE samples were treated with octanoic acid via a direct application of about 15 milliliters of the octanoic acid formula to each treated sample. The bags were immediately vacuum-packaged and sent through a Cryovac ST-101 cascading shrink tunnel. The shrink tunnel conveyor belt speed was set to expose the RTE foods to 200° F. water for about 5 seconds. Three replicates were completed per treatment. Samples were stored at 5° C. for 24 hours before being analyzed for population of L. monocytogenes. Fifty milliliters of University of Vermont broth were added to each bag. RTE food product samples were tumbled for 50 rotations and the resulting suspension was plated in Modified Oxford Medium Agar. Plates were incubated at 35° C. for 48 hours before the pathogen was enumerated.

TABLE 14

Efficacy of 1% Octanoic Acid and Heat in Killing *L. monocytogenes* on the Surfaces of Turkey Breasts and Roast Beef

| RTE Food | Antimicrobial Treatment | Heat | Average Log$_{10}$ CFU/sample | Log$_{10}$ Reduction Vs. Control |
|---|---|---|---|---|
| Turkey Breasts | None (control) | No Heat | 5.05 | NA |
| | 1% Octanoic Acid | No Heat | 3.72 | 1.33 |
| | | Cascading water, 200° F. for 5 sec | 3.08 | 1.97 |
| Roast Beef | None (control) | No Heat | 4.92 | NA |
| | 1% Octanoic Acid | No Heat | 4.11 | 0.81 |
| | | Cascading water, 200° F. for 5 sec | 3.66 | 1.26 |

The treatment of turkey breasts and roast beef with 1% octanoic acid and heat resulted in log reductions of 1.97 and 1.26, respectively, of *L. monocytogenes*. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows that octanoic acid meets FSIS requirements of a post-lethality treatment as described in FSIS Form 10,240-1.

Example 10

The following example determined the efficacy of a 1.0% octanoic acid solution against *L. monocytogenes* on roast beef where the octanoic acid composition was activated by passage through a modified drip flow shrink tunnel.

For this example, a solution of 1% octanoic acid using 3% Polysorbate 20 as a coupler was prepared and acidified pH 2.0 using 0.3% phosphoric acid. A second solution of 1% octanoic acid using 3% Polysorbate 20 as a coupler was prepared which was acidified to pH 4.0 using 2.55% citric acid and 0.6% sodium hydroxide. The efficacy of both formulas was evaluated. An equal-part mixture of five strains of *L. monocytogenes*, including Scott A (serotype 4b, human isolate), H7750 (not serotyped, frankfurter isolate), AC33 (not serotyped, cooked ham isolate), LM108M (serotype 1/2b, salami isolate), and F6854 (serotype 1/2a, frankfurter isolate), suspended in phosphate buffered dilution water were used. Roast beef samples were spot-inoculated with 50 microliters of the inoculum. The inoculum was spread using a sterile bent glass rod. Inoculated RTE food product samples were stored at 5° C. for 30 minutes before treatment to allow for bacterial attachment. RTE food product samples were placed in shrink bags. The RTE food product samples were treated with octanoic acid via a direct application of about 15 milliliters of either octanoic acid formula to each treated sample. The bags were immediately vacuum-packaged and sent through a modified Cyrovac ST-101 drip flow shrink tunnel. The shrink tunnel conveyor belt speed was set to expose the RTE foods to 200° F. water for about 7 seconds. Control samples were subjected to a 2-second submersion in water heated to 200° F. Three replicates were completed per treatment. Samples were stored at 5° C. for 24 hours before being analyzed for population of *L. monocytogenes*. Fifty milliliters of University of Vermont broth were added to each bag. RTE food product samples were tumbled for 50 rotations and the resulting suspension was plated in Modified Oxford Medium Agar. Plates were incubated at 35° C. for 48 hours before the pathogen was enumerated.

TABLE 15

Efficacy of 1% Octanoic Acid and Heat in Killing *L. monocytogenes* on Roast Beef

| Antimicrobial Treatment | Heat | Average Log$_{10}$ CFU/sample | Log$_{10}$ Reduction Vs. Control |
|---|---|---|---|
| None (control) | 2 sec | 4.31 | NA |
| 1% Octanoic Acid | 2 sec | 3.13 | 1.18 |
| 1% Octanoic Acid acidified to pH 2 with phosphoric acid | Drip flow water, 200° F. for 7 sec | 2.26 | 2.05 |
| 1% Octanoic Acid | 2 sec | 2.22 | 2.09 |
| 1% Octanoic Acid acidified to pH 4 with citric acid | Drip flow water, 200° F. for 7 sec | 2.05 | 2.26 |

Treatment of roast beef with 1% octanoic acid acidified to pH 2 with phosphoric acid and heat resulted in a 2.05 log reduction of *L. monocytogenes*, whereas the antimicrobial composition alone reduced populations of the pathogen by 1.18 logs. Treatment of roast beef with 1% octanoic acid acidified to pH 4 with citric acid and heat resulted in a 2.26 log reduction of *L. monocytogenes*, whereas the antimicrobial composition alone reduced populations of the pathogen by 2.09 logs. It has been published that naturally occurring *L. monocytogenes* contamination levels in RTE meat products is generally low (about <1 CFU/g). Thus, once activated, the antimicrobial composition renders the RTE product essentially free of *Listeria monocytogenes* contamination. This example shows that octanoic acid meets FSIS requirements of a post-lethality treatment as described in FSIS Form 10,240-1.

The foregoing summary, detailed description, and examples provide a sound basis for understanding the invention, and some specific example embodiments of the invention. Since the invention can comprise a variety of embodiments, the above information is not intended to be limiting. The invention resides in the claims.

What is claimed is:

1. A method of reducing microorganisms on a food product comprising:
    (a) applying an antimicrobial composition to a food product;
    (b) packaging the food product in a packaging to create a packaged food product;
    (c) sealing the packaged food product so that additional microorganisms are less likely to enter the packaging; and
    (d) applying a sub-lethal amount of heat at a temperature of from about 160° F. to about 210° F. to the sealed food product for about 2 to about 20 seconds to activate the antimicrobial composition, wherein the heat is applied in a shrink tunnel, the heat alone does not significantly reduce the microorganism population, and the heat activated antimicrobial reduces the microorganism population by about 1 log to about 3.5 logs.

2. The method of claim 1, wherein the food product is a ready-to-eat meat, or poultry product.

3. The method of claim 1, wherein the packaging is shrink-wrap packaging film and the film does not contain an antimicrobial composition.

4. The method of claim 1, wherein the antimicrobial composition is applied directly to the food product.

5. The method of claim 1, wherein the antimicrobial composition is applied indirectly to the food product.

6. The method of claim 1, wherein the application of the antimicrobial composition to the food product occurs prior to the packaging of the food product.

7. The method of claim 1, wherein the application of the antimicrobial composition to the food product occurs after the packaging of the food product.

8. The method of claim 1, wherein the application of the antimicrobial composition to the food product and the packaging of the food product occur substantially simultaneously.

9. The method of claim 1, wherein the heat is in the form of heated water.

10. The method of claim 1, wherein the antimicrobial composition comprises an active antimicrobial agent selected from the group consisting of fatty acid, acidified sodium chlorite, peroxyacid, and mixtures thereof.

11. The method of claim 10, wherein the active antimicrobial agent is octanoic acid.

12. The method of claim 10, wherein the antimicrobial composition further comprises additional functional ingredients selected from the group consisting of oxidizers, carriers, chelating agents, hydrotropes, thickening agents, gelling agents, foaming agents, film-forming agents, surfactants, coupling agents, acidulants, potentiators, flavoring aids, fragrance, dye, and mixtures thereof.

* * * * *

UNITED STATES PATENT AND TRADEMARK OFFICE
CERTIFICATE OF CORRECTION

PATENT NO.       : 9,560,873 B2                                    Page 1 of 1
APPLICATION NO.  : 11/459067
DATED            : February 7, 2017
INVENTOR(S)      : Burnett et al.

It is certified that error appears in the above-identified patent and that said Letters Patent is hereby corrected as shown below:

On the Title Page

Item (73) Assignee should include:

Hormel Foods Corporation, Austin, Minnesota

Signed and Sealed this
Sixteenth Day of May, 2017

Michelle K. Lee
*Director of the United States Patent and Trademark Office*